(12) United States Patent
Zeier et al.

(10) Patent No.: US 11,494,406 B2
(45) Date of Patent: *Nov. 8, 2022

(54) DIGITAL DECOUPLING

(71) Applicant: Accenture Global Solutions Limited, Dublin (IE)

(72) Inventors: Alexander Zeier, Königstein (DE); Dominik Wagenknecht, Vienna (AT); Alexander Kleber, Frankfurt (DE)

(73) Assignee: Accenture Global Solutions Limited, Dublin (IE)

( * ) Notice: Subject to any disclaimer, the term of this patent is extended or adjusted under 35 U.S.C. 154(b) by 27 days.

This patent is subject to a terminal disclaimer.

(21) Appl. No.: 17/319,748

(22) Filed: May 13, 2021

(65) Prior Publication Data

US 2021/0342364 A1 Nov. 4, 2021

Related U.S. Application Data

(63) Continuation of application No. 16/814,577, filed on Mar. 10, 2020, now Pat. No. 11,036,757.
(Continued)

(51) Int. Cl.
*G06F 7/00* (2006.01)
*G06F 16/27* (2019.01)
(Continued)

(52) U.S. Cl.
CPC .......... *G06F 16/27* (2019.01); *G06F 16/2358* (2019.01); *G06F 16/24565* (2019.01)

(58) Field of Classification Search
CPC .............. G06F 16/27; G06F 16/2358; G06F 16/24565; G06F 8/65; G06F 16/2386; G06F 16/355; G06F 16/2393
See application file for complete search history.

(56) References Cited

U.S. PATENT DOCUMENTS 7,702,747 B1 * 4/2010 Liu ..................... H04L 63/102
709/205
9,043,337 B1 5/2015 Chen et al.
(Continued)

OTHER PUBLICATIONS

PCT International Search Report and Written Opinion in International Appln. No. PCT/IB2020/057608, dated Nov. 18, 2020, 11 pages.
(Continued)

*Primary Examiner* — Mohammed R Uddin
(74) *Attorney, Agent, or Firm* — Fish & Richardson P.C.

(57) ABSTRACT

This document described digital decoupling architectures that enable existing computing systems to run in parallel with new computing technologies. In some aspects, a method includes receiving, by a digital decoupling system and from a source computing system, one or more updated data sets that each include data that has been updated at the source computing system. A source data entry of a source table of a database of the digital decoupling system is updated based on each updated data set. In response to detecting the change to the source table, a target data entry that includes data of the updated source data entry is added to a target table of the database. An adapter module obtains the data of the target data entry and generates an event that specifies the data of the target data entry. The event is sent to one or more destination computing elements.

20 Claims, 4 Drawing Sheets

Related U.S. Application Data (60) Provisional application No. 62/887,096, filed on Aug. 15, 2019.

(51) Int. Cl.
  *G06F 16/2455* (2019.01)
  *G06F 16/23* (2019.01)

(56) References Cited

U.S. PATENT DOCUMENTS

| | | |
|---|---|---|
| 9,544,351 B1 | 1/2017 | Lee et al. |
| 11,036,757 B2 | 6/2021 | Zeier et al. |
| 2003/0145021 A1 | 7/2003 | Parkkinen |
| 2003/0172368 A1 | 9/2003 | Alumbaugh et al. |
| 2004/0249644 A1 | 12/2004 | Schiefer et al. |
| 2009/0070391 A1 | 3/2009 | Blair et al. |
| 2009/0217289 A1 | 8/2009 | Onianwa et al. |
| 2009/0300646 A1 | 12/2009 | Wagner et al. |
| 2012/0143837 A1 | 6/2012 | Roy-Faderman et al. |
| 2013/0103817 A1 | 4/2013 | Koponen et al. |
| 2013/0117229 A1 | 5/2013 | Jain et al. |
| 2014/0006858 A1 | 1/2014 | Helfman et al. |
| 2014/0330780 A1 | 11/2014 | Chen et al. |
| 2015/0142719 A1 | 5/2015 | Behuria et al. |
| 2016/0085836 A1 | 3/2016 | Chen et al. |
| 2016/0132577 A1* | 5/2016 | Kruempelmann ...... G06F 16/27 707/625 |
| 2016/0182652 A1 | 6/2016 | Bevilacqua et al. |
| 2017/0169528 A1 | 6/2017 | Kundu et al. |
| 2018/0039490 A1* | 2/2018 | Gass ...................... G06F 8/427 |
| 2018/0046487 A1 | 2/2018 | Matters et al. |
| 2018/0253442 A1 | 9/2018 | Aithal et al. |
| 2018/0365952 A1 | 12/2018 | De Las Heras Villalon et al. |
| 2019/0325055 A1 | 10/2019 | Lee et al. |
| 2021/0049186 A1 | 2/2021 | Zeier et al. |

OTHER PUBLICATIONS

PCT International Preliminary Report on Patentability in International Appln. No. PCT/IB2020/057608, dated Feb. 8, 2022, 8 pages.

* cited by examiner

DIGITAL DECOUPLING

CROSS-REFERENCE TO RELATED APPLICATION

This application is a continuation of U.S. application Ser. No. 16/814,577, filed Mar. 10, 2020, which claims the benefit of U.S. Provisional Application No. 62/887,096, filed Aug. 15, 2019. Both of these applications are incorporated by reference in their entirety.

BACKGROUND

This specification relates to digital decoupling techniques that enable existing computing systems to run in parallel with new computing technologies.

Computing technology continues to improve at a very rapid pace. To some extent, organizations can adapt and upgrade their systems over time to make them compatible with the newer technology. However, there comes a point where the existing systems are either unable to support the newer technology or become so inferior that a major upgrade is required. A complete migration to a new system can be expensive and time consuming.

SUMMARY

This specification generally describes a digital decoupling architecture that enables existing computing systems to run in parallel with new computing technologies.

In general, one innovative aspect of the subject matter described in this specification can be embodied in methods that include the actions of receiving, by a digital decoupling system and from a data provisioning agent installed on a source computing system, one or more updated data sets that each include data that has been updated at the source computing system. For each updated data set, a source data entry of a source table of a database of the digital decoupling system is updated based on the data of the updated data set. A database trigger of the digital decoupling system detects a change to the source data table in response to the update to the source data entry. In response to detecting the change to the source table, a target data entry that includes data of the updated source data entry is added to a target table of the database. An adapter module of the digital decoupling system obtains, from the target table, the data of the target data entry. The adapter module generates an event that specifies at least a portion of the data of the target data entry. The event is sent to one or more destination computing elements different from the source computing system. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some aspects, updating the source data entry includes one of (i) adding the source data entry to the source table, wherein the source data entry includes the data of the updated data set or (ii) modifying the source data entry based on the data of the updated data set.

In some aspects, the database trigger initiates the event in response to detecting the addition of the source data entry to the source table. Some implementations can include removing, from the target table and by the adapter module, the data of the updated data set after the event is sent to the one or more destination computing elements.

In some aspects, sending the event to one or more destination computing elements includes sending the event to a cloud platform. Some aspects include configuring the data provisioning agent to detect changes to a database of the source computing system and to push a respective updated data set to the digital decoupling system in response to each detected change.

Some aspects include determining, by the adapter module and based on the data of the updated data set, a type of the event and including, in the event, data specifying the type of the event. In some implementations, the source computing system includes a SAP ECC platform and the destination computing element comprises a SAP HANA platform. The source tables and the target tables can include SAP HANA database tables.

The subject matter described in this specification can be implemented in particular embodiments and may result in one or more of the following advantages. The digital decoupling systems described in this document enable existing computing systems and new computing systems to operate in parallel using the same data. This allows newer technologies to consume the data of the existing computing system prior to a complete migration from the existing computing system. This also enables the use of newer software platforms with older platforms, without waiting for an entire migration that can take years to complete. Thus, newer technologies can be built on top of existing systems to enable quicker use of newer technologies.

The digital decoupling system can be configured to receive pushed updated data from the existing computing system and can convert the updated data to events that can be consumed by multiple different computing elements, e.g., multiple cloud applications, microservices, cloud platforms, user interfaces, etc. In this way, many different custom interfaces to the databases of the existing computing system do not have to be developed for the various computing systems. Instead, each consumer of the existing computing system's data can receive copies of the same event that specifies the updated data. This results in less complexity, fewer interfaces, and less bandwidth consumed to send data to each computing system.

The digital decoupling system can include a data management system, e.g., a SAP HANA system, that is configured to produce the events based on the updates to the existing computing system and that will later be used at the data management system of the new computing system to which the existing computing system is migrated. This enables newer technologies, e.g., new applications, to be built on the data management system during the migration and continue to be used after the migration is completed.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a digital decoupling architecture that enables existing computing systems to run in parallel with new computing technologies. An existing computing system can receive, generate, and process data in a normal manner. A data provisioning agent can be deployed on the existing computing system and can be configured to send new and modified data from the existing computing system to a digital decoupling system.

The digital decoupling system can be configured to receive the new or modified data from the existing computing system and convert the data into events consumable by applications and/or other computing systems, e.g., cloud-based applications and/or micro-services. In this way, new computing systems and applications that may be incompatible with the existing computing system and otherwise unable to interact with the existing computer system can operate in parallel with the existing computing system until a full migration from the existing computing system to a new computing system, e.g., a cloud-based computing system can be implemented.

Figure 1:
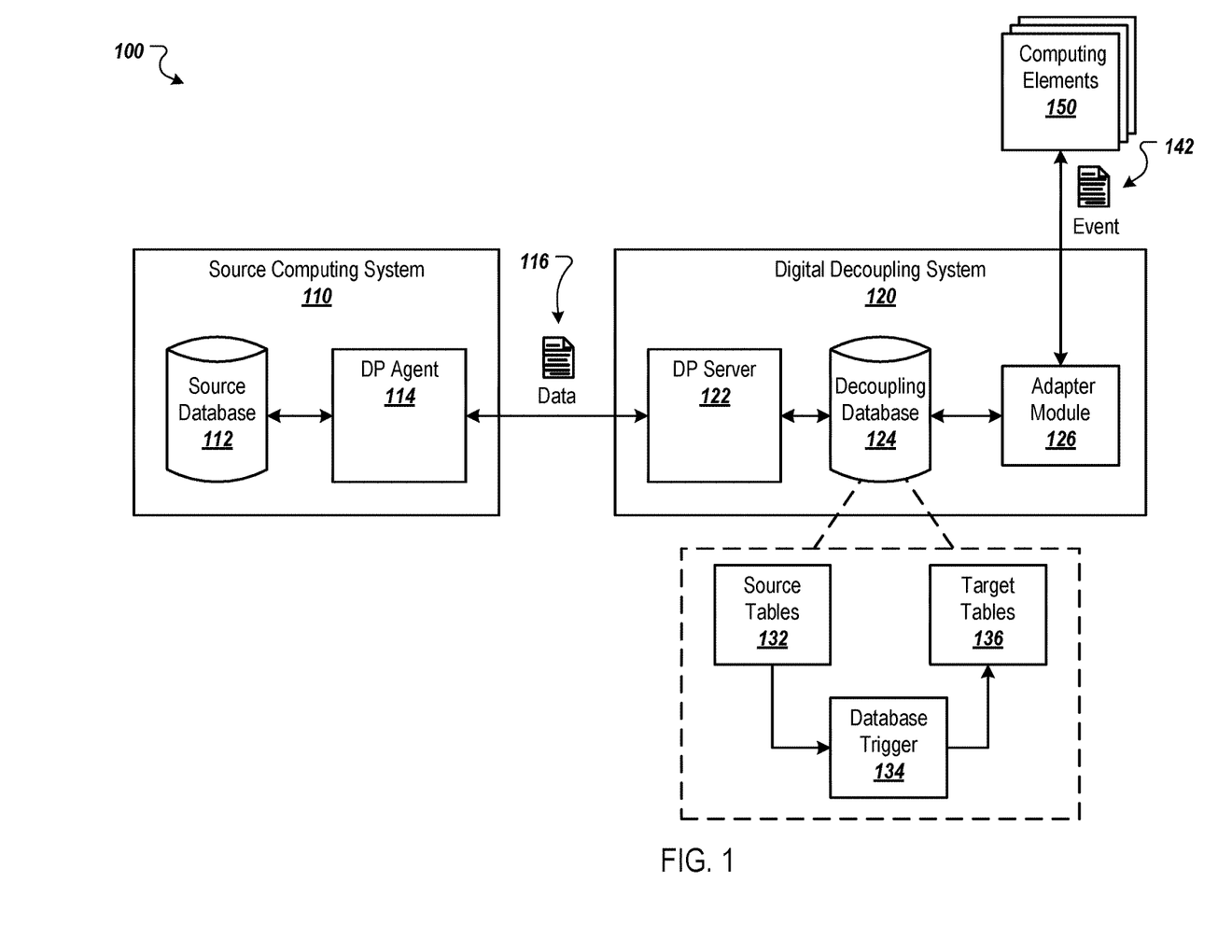
FIG. 1 is an example of an environment in which a digital decoupling system generates events based on updated data received from a source computing system.

FIG. 1 is an example of an environment 100 in which a digital decoupling system 120 generates events based on updated data received from a source computing system 110. The source computing system 110 can be an existing computing system that includes custom applications and/or custom business logic that perform functions using data stored by a source database system 112, which is also referred to as a database for brevity. For example, the source computing system 110 can be an enterprise computing system of an organization and the source database 112 can be an enterprise database system.

In a particular example, the source computing system 110 can be a set of network computers that run an on-premises enterprise resource planning (ERP) system, such as SAP™ ERP Central Component (SAP ECC). In this example, the source database 112 can be a SAP™ database system. A SAP™ ECC system can be migrated, for example, over to an SAP HANA™ platform. Such a migration can take a long period of time for large computing systems, e.g., enterprise systems of large corporations or other large organizations. Digital decoupling system 120 can enable the source computing system 110 to continue performing its processes and one or more destination computing elements 150 to perform processes using the same (or similar) data. The digital decoupling system 120 can be different from the source computing system 110, e.g., the two computing systems can be connected via a network.

The source database 112 can store data that is used and generated by various applications of the source computing system 110. For example, the source database 112 can store all or a large portion of the master data of an organization. To enable access to at least some of the data in the source database 112, a data provisioning agent 114 can be deployed on the source computing system 110, e.g., within the source database 112.

The data provisioning agent 114 can be configured, e.g., by a user, to push data of the source database 112 to the digital decoupling system 120. The data provisioning agent 114 can be configured to push updates to designated data to a corresponding data provisioning server 122 of the digital decoupling system 120. In other words, the data provisioning agent 114 can be configured to propagate changes to certain data in the source database 112 to the digital decoupling system 120.

A user can designate the data for which updates are sent to the digital decoupling system 120 using a set of propagation criteria. The propagation criteria can include particular tables within the database 120, particular fields within a table, particular rows or columns of a table, particular types of data, and/or other appropriate criteria. The data provisioning agent 114 can use the propagation criteria to determine what data to send to the digital decoupling system 120.

The data provisioning agent 114 can monitor the source database 112 for changes to data that meet the propagation criteria. The data provisioning agent 114 can monitor for new data added to the source database 112, modifications to data already stored in the source database 112, and/or deletions of data previously stored in the source database 112. When the data provisioning agent 114 detects a change to data that meets the propagation criteria, the data provisioning agent 114 can send an updated data set 116 to the data provisioning server 122. The updated data set 116 can include the data that has been updated in the source database 112 and that meets the propagation criteria.

For example, assume that the source database 112 includes data about books in a library. The propagation criteria may specify that when a checkout status of a book is changed, the data provisioning agent 114 is to send an identifier for the book, e.g., the title of the book or an International Standard Book Number (ISBN) for the book, and the checkout status of the book to the digital decoupling system 120. In this example, when the source database 112 is updated to indicate that a particular book has been checked out, the data provisioning agent 114 can detect the change to the checkout status of the book and generate an updated data set 116 that includes the title of the checked out book and the checkout status of the book. If the copyright data for the book is changed in this example, the data provisioning agent 114 would not send the updated copyright date as this date does not meet the propagation criteria.

In some implementations, the data provisioning agent 114 can use an adapter to monitor changes in the source database 112. In implementations in which the source computing system 110 is a SAP ECC system, the adapter can be an OracleECC adapter.

The data provisioning server 122 can receive the updated data sets 116 and update a decoupling database 124 of the digital decoupling system 124 based on the updated data sets 116. The decoupling database 124 can be a database system that stores data for use by the destination computing elements 150. In some implementations, the decoupling database can also be a database system that will later be used as the core data system for a computing system to which the source computing system 110 is migrating. In other words, the decoupling database 124 may eventually be the master database that replaces the database 112. In other implementations, the decoupling database 124 may only be used until the new computing system is in place for the organization.

In some implementations, the decoupling database 124 is an in-memory relational database management system that stores data on an item level. For example, the decoupling database 124 can be a SAP HANA™ in-memory, column-oriented, relational database management system. The use of item level storage prevents the loss of information due to information aggregation, which can be important for other operations that use the data. Item level storage also enables the implementation of additional logic before generating events based on the data. For example, the additional logic can provide for mappings, conversions, and/or analytics using the data. Item level storage can also help in connecting cloud-based services and other services that are limited in terms of integration capabilities where it might be needed to pre-build logic that cannot be implemented by the services.

The decoupling database 124 includes one or more source tables 132, a database trigger module 134, and one or more target tables 136. When an updated data set 116 is received from the data provisioning agent 114, the data provisioning server 122 can update a source data entry of the source tables 132 based on the updated data set 116. In some implementations, the source table 132 tracks changes to the data stored in the source database 112 that meet the propagation criteria. In this way, the data that meets the propagation criteria is the same in the source tables 132 and the source database 112. In implementations in which the decoupling database 124 is a SAP HANA™ in-memory database, the source tables 132 and the target tables 136 can be virtual, in-memory tables.

For example, if the updated data set 116 includes new data that was not previously stored in the source database 112, the data provisioning server 122 can add a source data entry, e.g., row or column, to the source table 132. This source data entry can include the new data added to the source database 112. If the updated data set 116 includes modified data, the data provisioning server 122 can modify an existing source data entry in the source tables 132 based on the updated data set 116. If the updated data set 116 specifies that data was deleted from the source database 112, the data provisioning server 122 can delete the source data entry corresponding to the deleted data from the source tables 132.

The database trigger module 134 can be a software module that is configured to monitor for and detect changes in the source tables 132, and update the target tables 136 based on the detected changes in the source tables 132. For example, the database trigger module 134 can be configured to monitor for any change, e.g., new data, modified data, or deleted data, to the source tables 132. In response to detecting a change, the database trigger module 134 can add a target data entry to the target tables 136.

The target data entry can include data of the source data entry that was changed. For example, the target data entry can match the updated source data entry. Continuing the previous library book example, assume that the source data entry is a row in the source tables 132 that includes data about a book in a library. If the data for the book is updated in the source database 112 and that updated data is propagated to the source tables 132, the database trigger 134 can add, as a row in the target tables 136, a target data entry that includes the same data as the updated row in the source tables 132.

The source tables 132 and the target tables 136 can have the same structure, e.g., the same row and column configuration. In this way, the database trigger 134 can simply copy an updated row from the source tables 132 to the target tables 136.

Unlike the source tables 132, the target tables 136 may only store data until the data is sent to the destination computing elements 150. In this way, the source tables 136 can match the relevant data in the source database 132 while the target tables 136 are used to generate events for consumption by the destination computing elements 150. Using two different tables can provide technical advantages for the described digital decoupling techniques. For example, the use of different tables facilitates keeping the tables 132 and 136 clean (e.g., without storing unnecessary data) and reduces the size of the tables 132 and 136 by only storing data as long as the data may be needed. This prevents the decoupling database 124 from being overloaded. The use of two tables enables the decoupling database 124 to apply logic to the data while transferring the data from one table to the other, providing additional flexibility.

The digital decoupling system 120 also includes an adapter module 126. The adapter module 126 can be a software module that is configured to detect when data is added to the target tables 136 and generate events based on the data. For example, the adapter module 126 can monitor for the addition of data, e.g., new target data entries, in the target tables 136.

When a target data entry is added to the target tables, the adapter module 126 can generate an event 142 for the target data entry. The event 142 can include event data that is based on the data of the target data entry. The adapter module 126 can generate an event 142 by configuring the data of the target data entry into the format of the events. For example, the computing systems 150 may be configured to receive events having a particular format, e.g., a particular set of fields that each include particular types of data. The adapter module 126 can take the data of the target data entry and place each piece of data into the proper field of an event 142. The adapter module 126 can then send the event 142 to the destination computing elements 150.

The destination computing elements 150 can include cloud computing platforms, cloud applications, on-premise applications running on on-premise computers connected to the digital decoupling system, cloud microservices, user interfaces of computers, etc. Each destination computing elements 150 can be configured to listen for events sent by the adapter module 126. For example, each destination computing element 150 can subscribe to messages that include the events 142.

In some implementations, each destination computing element 150 can subscribe to particular types of events (e.g., fewer than all events), or to all events send by the adapter module 126. In this example, the adapter module 126 can specify, for each event, the type of the event in the event data of the event. The type of event can be based on the type of data change, add, modify, or delete, or the type of data that was updated, e.g., title of book change, checkout status change, etc.

In some implementations, the adapter module 126 streams the events to a data streaming platform. For example, the adapter module 126 can stream the events to an Apache Kafka™ data streaming platform. In another example, the adapter module 126 can be deployed in the Apache Kafka™ data streaming platform. For example, the adapter module 126 can include custom code for monitoring the target tables and converting the data in the target tables 136 into events that are streamed by the Apache Kafka™ data streaming platform. The data streaming platform can stream the events to the destination computing elements 150.

Using the digital decoupling system 120, each destination computing element 150 can receive relevant data from the existing computing system 110. In some implementations, the digital decoupling system 120 can provide the data in real time or near real time, e.g., within a couple of seconds after the data is updated in the source database 112. For example, the data provisioning agent 114, the database trigger 134, and the adapter module 126 can all be configured to continuously monitor for their respective data and response immediately (or within a short time period) in response to detecting a change in the data. In this way, from a technical perspective, it is as if the destination computing elements 150 are directly connected to the source database 112.

In addition, the digital decoupling system 120 eliminates the need for a custom interface to be created for each destination computing element 150. Without the digital decoupling system 120, each destination computing element 150 that wants access to the data of the source database 112 would need a custom interface to the source database 112. The digital decoupling system 120 creates a less complex system and more efficient system in which each destination computing element 150 can receive updated data from the source database 112 from the same events 142, which also reduces that amount of data that has to be transmitted from the source database 112.

In some implementations, the digital decoupling system 120 can provide two-way communication between the source database 112 and the destination computing elements 150. For example, if an application wants to provide confirmation or other data to the source database 112, the application can provide the data to the digital decoupling system 120. In turn, the digital decoupling system 120 can configure the data for the source database 112 and provide the configured data to the source database 112. If the source database 112 is a SAP™ database, the digital decoupling system 120 can provide the data to the application layer of the SAP™ database.

Figure 2:
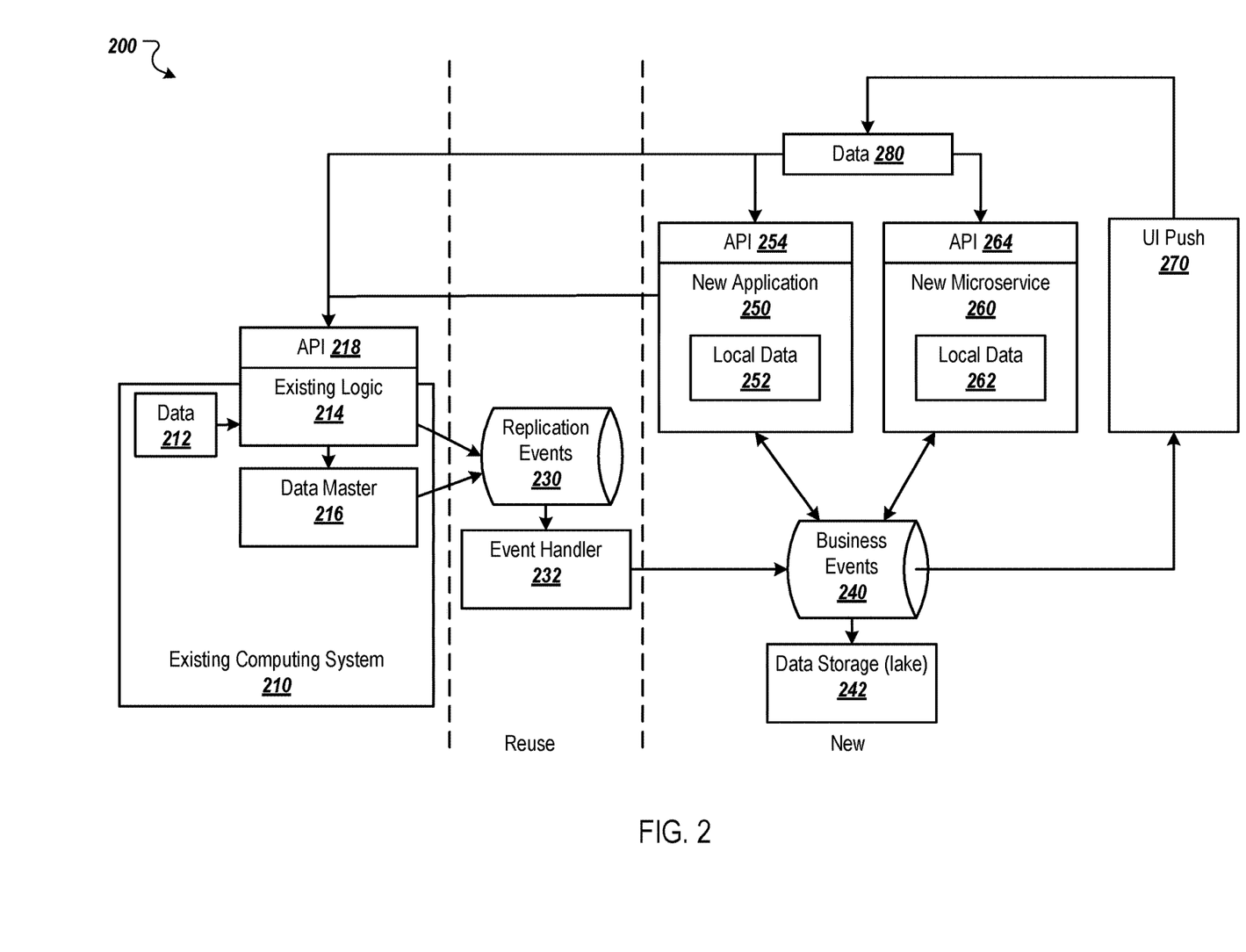
FIG. 2 is a block diagram illustrating an example decoupling pipeline.

FIG. 2 is a block diagram illustrating an example decoupling pipeline 200. The decoupling pipeline 200 includes an existing computing system 210 that has existing logic 214 that performs operations based on input data 212 and a data master 216, which can be a database system that stores the master data for the existing computing system 210. The existing computing system 210 can also include an application programming interface API 218.

When data of the data master 216 is updated, the data can be replicated as replication events 230. The replication events 230 can include the updated data, which can be stored in source tables and/or target tables, as described above with reference to FIG. 1. An event handler 232, e.g., an adapter module, can convert the replication events 230 into business events 240 for consumption by other computing elements, e.g., a new application 250, a new microservice 260, or a user interface push application 270. The data of the business events can also be stored in a data storage unit 242, which can be long term storage such as hard drives, flash memory, cloud storage, data lake, etc.

The new application 250 and the new microservice 260 can each include local data 252 and 262, respectively. The local data is data generated and/or stored locally by the new application 250 or the new microservice 260. The new application 250 includes an API 254 and the new microservice 260 includes an API 264. The APIs 218, 254, and 264 enable the existing computing system 210, the new application 250, and the new microservice 260, respectively, to receive pushed data 280 from the user interface push application 270. The APIs 218, 254, and 264 are optional and can facilitate the implementation of digital decoupling architectures. Implementing the APIs 218, 254, and 264 can further decouple the different components in the architecture and can add more monitoring capabilities to manage the architecture in the long run.

Figure 3:
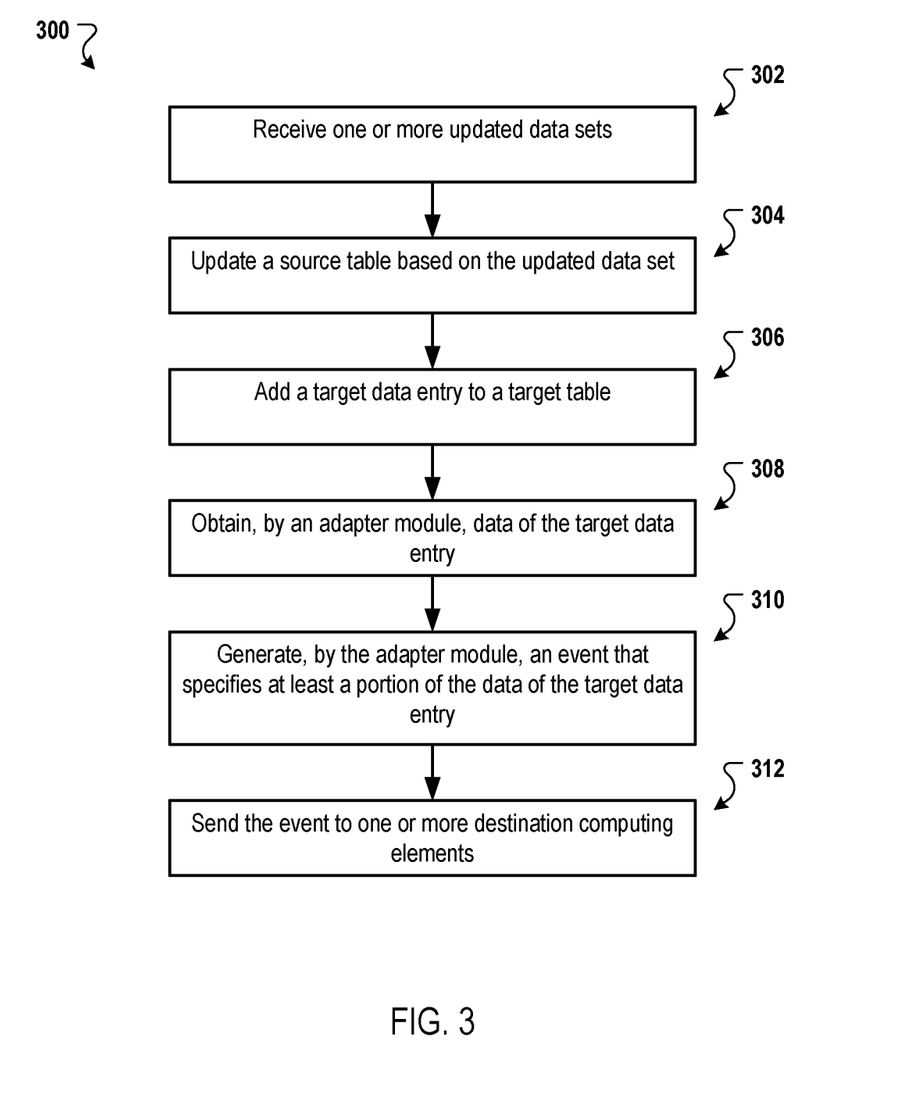
FIG. 3 is a flow diagram of an example process for generating events based on updated data received from a source computing system.

FIG. 3 is a flow diagram of an example process 300 for generating events based on updated data received from a source computing system. The process 300 can be implemented by the digital decoupling system 120. Operations of the process 300 can also be implemented as instructions stored on non-transitory computer readable media, and execution of the instructions by one or more data processing apparatus can cause the one or more data processing apparatus to perform the operations of the process 300.

One or more updated data sets are received (302). The updated data sets can be received by a data provisioning server of the digital decoupling system. A data provisioning agent deployed on a source computing system can send the updated data sets to the data provisioning server in response to updates to data stored by the source computing system. Each updated data set can include updated data that has been updated at the source computing system. For example, the data provisioning agent can push the updated data sets to the digital decoupling system in response to detecting the update to the data.

A source table is updated based on the updated data set (304). The data provisioning server can update a source data entry of the source table based on the data of the updated data set. For example, if the updated data set specifies new data that was added to the existing computing system, the data provisioning server can add a new source data entry to the source table. This source data entry can include the data of the updated data set.

A target data entry is added to a target table (306). As described above, a database trigger module can be configured to detect changes to the source table and add target data entries to the target table in response to the addition. The target data entry can include the data of the source data entry.

An adapter module obtains data of the target data entry (308). For example, the adapter module can monitor the target table for any new addition to the target table. In response to detecting a new target data entry in the target table, the adapter module can obtain the data of the new target data entry.

The adapter module generates an event that specifies at least a portion of the data of the target data entry (310). The adapter module can generate event data for the event based on a particular format for the event data. The particular format can be based on the format of a data streaming platform that streams events or a format of destination computing elements that will receive and consume the event data.

The adapter module sends the event to one or more destination computing elements (312). The adapter module can send the event to the destination computing elements by streaming the event to a data streaming platform. The destination computing elements can include applications, microservices, cloud computing platforms, etc., as described above.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 4:
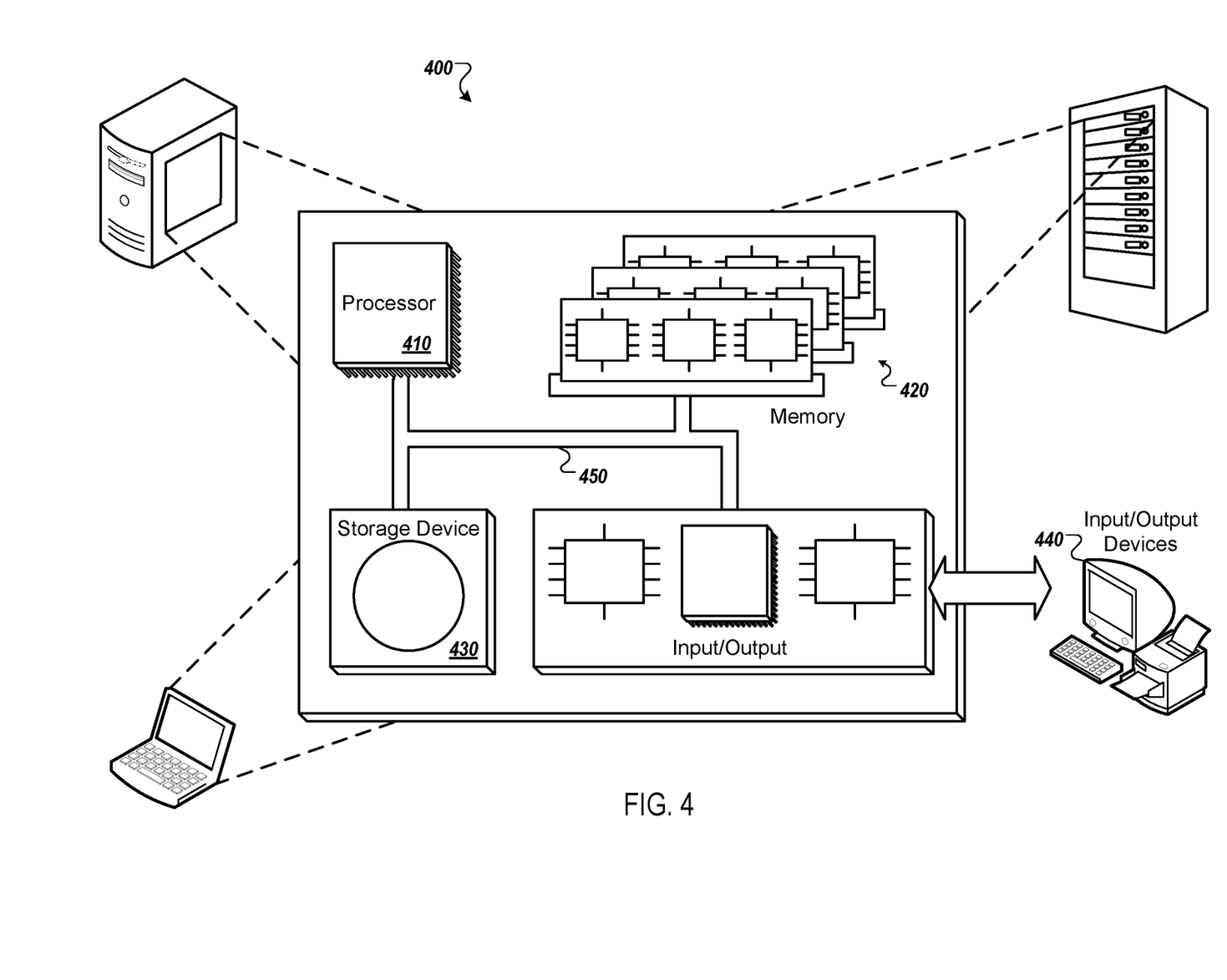
FIG. 4 is a block diagram of a computing system that can be used in connection with computer-implemented methods described in this document.

An example of one such type of computer is shown in FIG. 4, which shows a schematic diagram of a generic computer system 400. The system 400 can be used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving, by a digital decoupling system and from a data provisioning agent installed on an existing on-premises source computing system comprising an enterprise resource planning system from which the data provisioning agent obtains data, one or more updated data sets that each include data that has been updated at the source computing system;
for each updated data set, updating, based on the updated data set, a source data entry of a source table of a database of the digital decoupling system;
monitoring, by a database trigger of the digital decoupling system, for updates to the source table;
in response to each update to the source table, adding, to a target table of the database that is separate from the source table, a target data entry that includes data of each updated source data entry of the source table;
monitoring, by an adapter module of the digital decoupling system, for updates to target data entries of the target table; and
in response to each update to the target table,
generating, by the adapter module, an event that specifies at least a portion of an updated target data entry of the target table;
sending the event to a plurality of different destination computing elements, wherein the destination computing elements comprise at least one cloud application; and
removing the updated target data entry from the target table.

2. The computer-implemented method of claim 1, wherein the data provisioning agent is configured to push data of a source database of the source computing system that satisfies propagation criteria to the digital decoupling system, wherein the propagation criteria comprises at least one of (i) one or more particular tables of the source database, (ii) one or more particular fields of the source database, or (iii) particular types of data of the source database.

3. The computer-implemented method of claim 2, wherein the source table persists the updated data sets received from the source computing system such that, for each updated data set, the source table tracks changes to data of the source database that satisfies the propagation criteria.

4. The computer-implemented method of claim 1, wherein each destination computing element is unable to access data of the source computing system.

5. The computer-implemented method of claim 1, further comprising:
determining, by the adapter module and based on the data of the updated data set, a type of the event; and
including, in the event, data specifying the type of the event.

6. The computer-implemented method of claim 1, wherein updating the source data entry comprises one of (i) adding the source data entry to the source table, wherein the source data entry includes the data of the updated data set or (ii) modifying the source data entry based on the data of the updated data set.

7. The computer-implemented method of claim 1, wherein the database of the digital decoupling system comprises an in-memory database.

8. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
receiving, by a digital decoupling system and from a data provisioning agent installed on an existing on-premises source computing system comprising an enterprise resource planning system from which the data provisioning agent obtains data, one or more updated data sets that each include data that has been updated at the source computing system;

for each updated data set, updating, based on the updated data set, a source data entry of a source table of a database of the digital decoupling system;

monitoring, by a database trigger of the digital decoupling system, for updates to the source table;

in response to each update to the source table, adding, to a target table of the database that is separate from the source table, a target data entry that includes data of each updated source data entry of the source table;

monitoring, by an adapter module of the digital decoupling system, for updates to target data entries of the target table; and in response to each update to the target table,
generating, by the adapter module, an event that specifies at least a portion of an updated target data entry of the target table;
sending the event to a plurality of different destination computing elements, wherein the destination computing elements comprise at least one cloud application; and
removing the updated target data entry from the target table.

9. The computer-implemented system of claim 8, wherein the data provisioning agent is configured to push data of a source database of the source computing system that satisfies propagation criteria to the digital decoupling system, wherein the propagation criteria comprises at least one of (i) one or more particular tables of the source database, (ii) one or more particular fields of the source database, or (iii) particular types of data of the source database.

10. The computer-implemented system of claim 9, wherein the source table persists the updated data sets received from the source computing system such that, for each updated data set, the source table tracks changes to data of the source database that satisfies the propagation criteria.

11. The computer-implemented system of claim 8, wherein each destination computing element is unable to access data of the source computing system.

12. The computer-implemented system of claim 8, wherein the operations comprise:
determining, by the adapter module and based on the data of the updated data set, a type of the event; and
including, in the event, data specifying the type of the event.

13. The computer-implemented system of claim 8, wherein updating the source data entry comprises one of (i) adding the source data entry to the source table, wherein the source data entry includes the data of the updated data set or (ii) modifying the source data entry based on the data of the updated data set.

14. The computer-implemented system of claim 8, wherein the database of the digital decoupling system comprises an in-memory database.

15. A non-transitory, computer-readable medium storing one or more instructions executable by a computer system to perform operations comprising:
receiving, by a digital decoupling system and from a data provisioning agent installed on an existing on-premises source computing system comprising an enterprise resource planning system from which the data provisioning agent obtains data, one or more updated data sets that each include data that has been updated at the source computing system;

for each updated data set, updating, based on the updated data set, a source data entry of a source table of a database of the digital decoupling system;

monitoring, by a database trigger of the digital decoupling system, for updates to the source table;

in response to each update to the source table, adding, to a target table of the database that is separate from the source table, a target data entry that includes data of each updated source data entry of the source table;

monitoring, by an adapter module of the digital decoupling system, for updates to target data entries of the target table; and in response to each update to the target table,
generating, by the adapter module, an event that specifies at least a portion of an updated target data entry of the target table;
sending the event to a plurality of different destination computing elements, wherein the destination computing elements comprise at least one cloud application; and
removing the updated target data entry from the target table.

16. The non-transitory, computer-readable medium of claim 15, wherein the data provisioning agent is configured to push data of a source database of the source computing system that satisfies propagation criteria to the digital decoupling system, wherein the propagation criteria comprises at least one of (i) one or more particular tables of the source database, (ii) one or more particular fields of the source database, or (iii) particular types of data of the source database.

17. The non-transitory, computer-readable medium of claim 16, wherein the source table persists the updated data sets received from the source computing system such that, for each updated data set, the source table tracks changes to data of the source database that satisfies the propagation criteria.

18. The non-transitory, computer-readable medium of claim 15, wherein each destination computing element is unable to access data of the source computing system.

19. The non-transitory, computer-readable medium of claim 15, wherein the operations comprise:
determining, by the adapter module and based on the data of the updated data set, a type of the event; and
including, in the event, data specifying the type of the event.

20. The non-transitory, computer-readable medium of claim 15, wherein updating the source data entry comprises one of (i) adding the source data entry to the source table, wherein the source data entry includes the data of the updated data set or (ii) modifying the source data entry based on the data of the updated data set.

* * * * *